United States Patent

Turner

[15] 3,676,874

[45] July 11, 1972

[54] FLUID SUPPORTED PAD WITH MEANS TO PRODUCE CONTACT BETWEEN HEAD AND RECORD MEDIUM

[72] Inventor: Ian Turner, Stevenage, England

[73] Assignee: International Computers Limited, London, England

[22] Filed: March 9, 1970

[21] Appl. No.: 17,727

[30] Foreign Application Priority Data

March 12, 1969 Great Britain ....................12,928/69
March 12, 1969 Great Britain ....................12,929/69

[52] U.S. Cl. ....................340/174.1 E, 179/100.2 P
[51] Int. Cl. ....................G11b 5/60
[58] Field of Search ....................179/100.2 P; 340/174.1 E

[56] References Cited

UNITED STATES PATENTS

| | | | |
|---|---|---|---|
| 3,480,936 | 11/1969 | Gerlach et al. | 340/174.1 E |
| 2,905,768 | 9/1959 | Cronquist | 179/100.2 P |
| 3,249,701 | 5/1966 | Silver | 179/100.2 P |
| 3,213,461 | 10/1965 | Goddard | 179/100.2 P |

*Primary Examiner*—Bernard Konick
*Assistant Examiner*—J. Russell Goudeau
*Attorney*—Hane, Baxley & Spiecens

[57] ABSTRACT

A magnetic transducing head assembly with a magnetic head being maintained in contact with a record member during relative motion between the head and record member. The head is resiliently mounted on a pad by a diaphragm. A source of pressure produces a cushion of air which separates the pad from the record member by a desired distance with the head protruding from the pad by at least the desired distance. The diaphragm urges the head into contact with the record member when the pad is separated from the record member by the desired distance. In another embodiment, high and low pressure areas are produced to separate the pad from the record member and to maintain the head in contact with the record member.

4 Claims, 2 Drawing Figures

INVENTOR
IAN TURNER
By Hane, Baxley and Spiecens
ATTORNEYS

FLUID SUPPORTED PAD WITH MEANS TO PRODUCE CONTACT BETWEEN HEAD AND RECORD MEDIUM

BACKGROUND OF THE INVENTION

This invention relates to magnetic transducing head assemblies for recording signals on and reproducing signals from a record member.

In electronic data processing apparatus, it is a common requirement that electrical signals representing items of data, be written or recorded in a storage device, and, at a later time, be read out or reproduced from the storage device. However, in order for a data processing apparatus to be effective, there must be rapid access to and from the storage device and the size of the storage device must be kept as small as possible.

In the past, magnetic drums have been employed as storage devices, but it has been found that for most present day requirements, access to and from such drums is too slow. Magnetic discs have been proposed as storage devices as discs allow a rapid access and are capable of storing a large number of data signals on a member of reasonable size. A problem with discs is that they are easily damaged by faulty recording techniques and are expensive to replace. In order to avoid wear and damage to such discs, recording techniques have been developed in which a magnetic head is floated on a cushion of air, out of contact with the disc, during recording operations. The cushion of air is usually extremely thin, and some biasing device, such as a spider arrangement, is required to hold the head assembly close to the record medium. One problem, however, is that extreme care must be taken to prevent the head from colliding with the disc surface during the recording operation, for such collisions can result in serious damage to an expensive disc. Another problem with air floated discs is that the effective air gap of the head is increased which limits the packing density which can be achieved with a particular disc.

DESCRIPTION OF THE PRIOR ART

It has been found that problems associated with air floated heads can be substantially avoided or eliminated by resiliently mounting a magnetic head in a pad and producing a cushion of air to separate the pad from the record medium while maintaining the head in contact with the surface of the record medium. Thus, the problems of damage to the record medium by collision of the head therewith are avoided by maintaining the head in contact with the record medium. Also, it has been found that the packing density which can be achieved is substantially increased. By resiliently mounting the head in the pad, the head will follow any variations in the surface of the record medium without incurring any "dropout" or loss of signal.

According to the present invention, a magnetic transducing head assembly includes a magnetic head which is required to be in contact with a record member and having a surface for engaging said record member, a pad, pressure means to create at a pressure greater than ambient pressure, a cushion of air between the record and the record member to space the pad from the record member by a desired distance, and resilient means for mounting the head on the pad with said surface of the head projecting by at least said desired distance from the pad so that the head is lightly maintained in contact with the record member when the pad is spaced by said desired distance from the record member.

BRIEF DESCRIPTION OF THE DRAWINGS

Apparatus embodying the present invention will now be described, by way of example, with reference to the accompanying drawing, in which.

Figure 1:
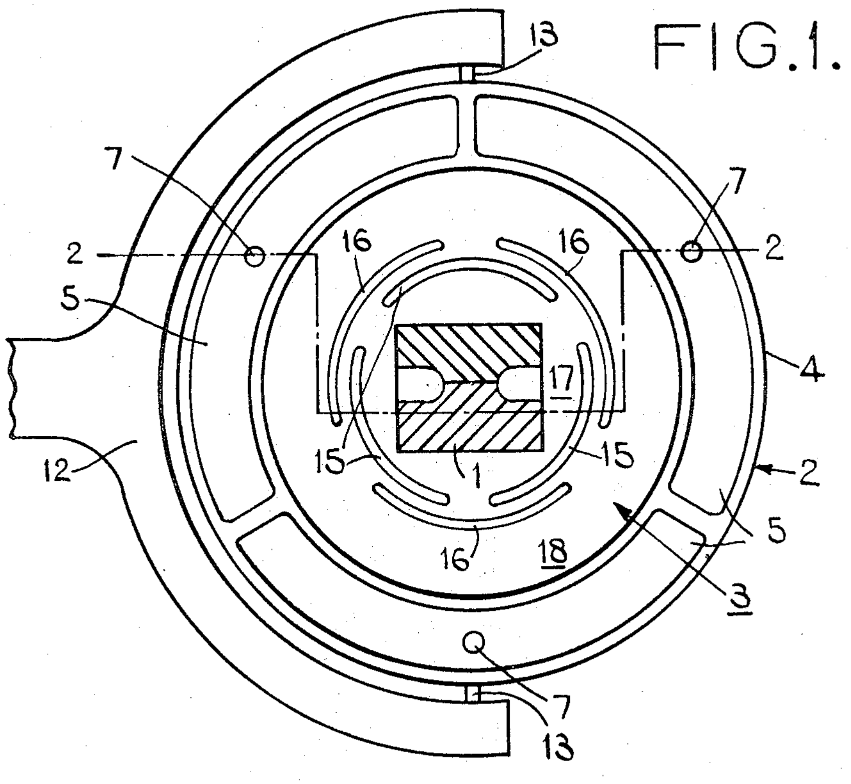
FIG. 1 is an underneath plan view of a fluid supported mounting for a magnetic transducing head.
Figure 2:
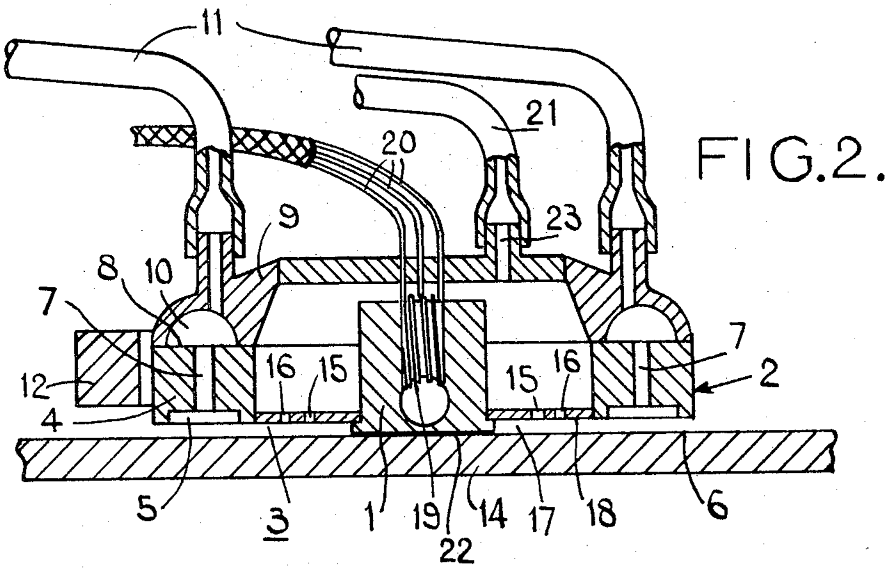
FIG. 2 is a sectional view of the mounting along the line 2—2 of FIG. 1.

Referring first to FIG. 2, in this particular embodiment, a magnetic transducing head 1 having a record engaging surface 22, is mounted in a pad 2 which is caused to hover on a cushion of air above a record disc. The magnetic transducing head 1 is mounted on a resilient diaphragm 3 which diaphragm 3 is secured at its periphery to the lower inner edge of an annular base member 4 of the pad 2. The base member 4 has a number of arcuate recesses 5 formed in its lower surface 6. In the illustrated embodiment three recesses 5 are provided each of which extends along approximately one third of the surface 6. Passageways 7 extend through the base member 4 from its upper surface 8 to the recesses 5. A manifold 9 is secured to the upper surface 8 of the base member 4 and an annular cavity 10 in the manifold 9 communicates with each of the passageways 7. Fluid, such as air, under pressure is supplied to the cavity 10 through flexible tubes 11. The space enclosed by the base member 4 and the manifold 9 is subjected to a pressure less than ambient pressure by connection through opening 23 and tube 21 to a suction pump. If desired a single pump may be used having its output connected to the tubes 11 and its input connected to tube 21. The pad 2 is mounted on an arm 12 by means of pivot pins 13 (FIG. 1) engaging the base member 4. The arm 12 is mounted by means not shown to permit movement of the base member 4, and the head 1 carried thereby, parallel to the surface of a record disc 14 to enable the head 1 to be located so as to be magnetically coupled to any desired track of the record disc. The mounting of the arm 12 also permits movement of the pad 2 normal to the record disc surface.

The diaphragm 3 consists of a disc of resilient material having inner and outer sets of concentric slots 15,16, each slot 15,16 subtending an angle of slightly less than 120° at the center of the disc and the slot 15 of the outer set being angularly offset relative to the slots 16 of the inner set by approximately 60°. The material of the diaphragm between the slots of each set supports the inner portion 17 of the diaphragm relative to the outer portion 18 of the diaphragm in such a manner that the head 1 may rise and fall, in a direction normal to the record surface, relative to the pad 2 and in addition, the head 1 is permitted to pivot to a limited extent about the center of the diaphragm whereby the head is enabled to remain in intimate contact with the record surface despite imperfections in the record surface.

In operation the air supplied under pressure to the manifold 9 through the tubes 11 passes through the passageways 7 into the recess 5 to produce a region of high pressure air acting as a cushion between the base member 4 and the record disc 14 which is effective to raise and support the pad 2 out of contact with the record disc 14. The slots 15, 16 in the diaphragm 3 permit fluid communication between the interior of the pad, maintained at low pressure, and the space lying between the diaphragm 3 and the record disc 14 and bounded by the inner edge of the base member whereby a region of low pressure is produced between the pad 2 and the record disc 14.

The low pressure region and the region of high pressure air produce opposed forces acting on the pad 2, the force due to the high pressure region acting to move the pad away from the record disc 14 and the force due to the low pressure region acting to move the pad toward the record disc 14. By selecting suitable values of high and low pressure the pad 2 may be supported in a stable manner at a desired distance above the surface of the record disc 14.

For a constant value of high pressure, the force acting on the pad due to the high pressure air region alone varies in dependence upon the spacing between the pad 2 and the record disc 14. The force has a high value for zero spacing of the pad from the record disc and decreasing with increase of spacing. Similarly the force due to the region of low pressure alone varies in dependence upon the spacing of the pad from the record disc. For a range of values of spacing near to zero spacing the force is substantially constant and the range of values of spacing for substantially constant force is dependent upon the resistance to air flow from the region of high pressure and to the region of low pressure respectively. For example, if the resistance to flow of air to the low pressure region is made relatively large, the force acting on the pad remains substantially constant over a large range of values of distance. This resistance to flow of air may be produced by providing a relatively wide land or other barrier to air flow on the inner edge of the base member 4 bounding the low pressure region between the diaphragm and the record surface. In order to support the pad at a desired spacing from the record surface, the pad is constructed so that the resistances to flow of air from the high pressure region and to flow of air to the low pressure region together with selected values of high and low air pressure give face/spacing characteristics in which the low pressure force is substantially constant for small variations of spacing from the desired spacing and in which the high pressure force changes rapidly for small variations of spacing from the desired spacing. Thus the resultant force acting on the pad is zero at the desired spacing and for increase of spacing from the desired spacing, the force acts on pad toward the record surface, whereas for decrease of spacing from the desired spacing the force acts away from the record surface. Therefore, the pad is supported and maintained at a desired spacing from the record surface since any deviation from the desired spacing produces a resultant force acting to decrease the deviation. This is particularly advantageous when the record surface is not absolutely planar but has hills and vales and yet the pad is required to follow the contour of the surface at the desired spacing therefrom. As the pad ascends a hill on the surface or descends into a vale, there is a tendency as the pad reaches the peak of the hill, or vale, for the pad to tend to continue in this line of motion and therefore deviate from its desired spacing. On passing the peak of the hill, the pad tends to move away from the record surface whereas on passing the peak of the vale it tends to contact the record surface. When the pad is used, as in the present example, for supporting a recording head these deviations result respectively in loss of signal strength or to catastrophic damage to the record surface.

With respect to the operation of the device in FIG. 2, communication between the space enclosed by manifold 9 and base member 4 is not essential. Manifold 9 maybe constructed without opening 23 and tube 21 may be dispensed with as not being necessary. On operation of the modified device, air supplied to the manifold 9 through tubes 11 passes through the passageways 7 into the recess 5 to produce a cushion of air between the base member 4 and the record disc 14 which is effective to raise and support the pad 2 out of contact with the record disc 14. The head 1 is positioned in the diaphragm 3 such that its record engaging surface 22 protrudes beyond the plane of the surface 6 so that when the pad 2 hovers on the cushion of air out of contact with record disc 14, the surface 22 of the head 1 is lightly maintained in contact with the record disc 14. For example; the air pressure may be adjusted to cause the surface 6 of the base member 4 to be spaced approximately 0.002 inches above the record surface. The mounting of the head 1 in the diaphragm 3 and the resilience of the diaphragm are arranged to produce a reaction between the head 1 and the record surface of approximately 5 grams.

Returning now to FIG. 1, head 1 is shown as resiliently mounted in pad 2 by diaphragm 3. Base member 4, having passageways 7 therein, is positioned substantially around the circumference of the pad 2. Pivot pins 13 are provided for mounting pad 2 on arm 12 in a gimbal like manner while slots 15 and 16 in diaphragm 3 as hereinbefore described.

It will be appreciated that the pad and record may be in any desired orientation, for example, the pad and record may be inverted relative to the orientation shown in FIG. 2, the air pressures being adjusted to provide a resultant zero force at the required spacing.

Gravitational forces acting on the pad may be counterbalanced by suitable means such as a spring or counterweight in which case the resultant force on the pad at the desired spacing due to the air pressures is arranged to be zero or the resultant force due to the air pressures may be arranged to counterbalance the gravitational forces so that the resultant of the air pressure forces and gravitational forces is zero at the required spacing.

Electrical connections are made to the winding 19 shown diagrammatically of the head 1 by means of flexible conductors 20.

Whilst in the above embodiment a diaphragm is utilized for mounting the head in the hover pad other mountings may be used. For example, the diaphragm could be replaced by a suitable spider.

A lubricant to reduce friction between the head 1 and the record disc 14 may be introduced into the fluid applied under pressure to the manifold 9 and this lubricant is then carried by the fluid to the record surface. A suitable lubricant is a near saturated vapor of isopropyl alcohol.

I claim:

1. A magnetic recording assembly including a rotatable record disc having a substantially planar recording surface; a magnetic head having a flat face engaging said recording surface; a pad having apertures therein; a resilient member extending around the head and connecting the head to the pad, said resilient member permitting the head to pivot relatively to the plane of the recording surface; a source of pressurized fluid connected to the apertures in the pad for producing fluid flow from the apertures toward the recording surface effective to produce a cushion fluid supporting the pad spaced from the recording surface by a distance such that the pad exerts, through the resilient member, a pressure on the head toward the recording surface to maintain the flat face of the head in engagement with the recording surface.

2. A magnetic recording assembly as claimed in claim 1 in which the pad is an annular shaped member and the magnetic head is positioned centrally of the pad.

3. A magnetic recording assembly as claimed in claim 2 in which the resilient member consists of a diaphragm.

4. A magnetic recording assembly as claimed in claim 3 in which the diaphragm has apertures therein and including a source of low pressure connected through said apertures to a region between the diaphragm and the recording surface to produce a low pressure in said region acting in opposition to said cushion of fluid and effective in combination with said cushion of fluid to maintain the pad spaced from the recording surface by said distance.

* * * * *